United States Patent Office

3,113,426
Patented Dec. 10, 1963

3,113,426
CYCLODODECANE AS A HIGH ENERGY FUEL
John O. Smith, Swampscott, and K. Warren Easley, Wayland, Mass., assignors, by mesne assignments, to Monsanto Research Corporation, Everett, Mass., a corporation of Delaware
No Drawing. Filed Oct. 19, 1960, Ser. No. 63,474
5 Claims. (Cl. 60—35.4)

This invention relates to high energy fuels. More particularly, this invention relates to methods of developing thrust and to methods of operating reaction type power plants. This invention especially contemplates a high energy fuel composition comprising cyclododecane as an essential ingredient.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbo-jet, or pulse-jet engine, exhaustion of the high temperature gases is directed in a rearward direction to produce a true jet propulsion. In a turbine type engine, such as a gas turbine, or a turbo-prop engine, the exhaustion of high temperature gases is directed into a turbine which drives a propeller or other mechanical means for developing a forward thrust. Reaction type power plants may be used in widely different types of vehicles, such as in space-ships, aircraft, boats, guided missiles, automobiles, and the like.

Heretofore, it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher but the presently available JP-4 fuel is thermally stable to a temperature of only about 400° F. Therefore, it is desirable to have a fuel which is thermally stable at a temperature of at least as high as 500° F.

Another serious disadvantage of the prior art fuels is the low heat of combustion of such fuels. Aircraft generally, and particularly military aircraft, are being designed for higher and higher speeds requiring higher energy level fuels. The fuel must not only have a high energy level on a weight basis or high B.t.u./lb., but also a high energy level on a volume basis or high B.t.u./gal. since wing sections are being made thinner in order to reduce drag and space for storage of fuel is limited. Thus, aircraft are often volume limited as well as weight limited for the storage of fuel. Aircraft are particularly volume limited using the currently available JP-6 high energy fuel which has a heat of combustion of 18,400 B.t.u./lb. on a weight basis but a heat of combustion of only 119,500 B.t.u./gal. on a volume basis. Therefore, it is very desirable to provide a high energy fuel having a high heat of combustion on a volume basis, preferably greater than 120,000 B.t.u./gal., and at the same time obtain the other characteristics necessary for a good fuel of this type.

An object of this invention is to provide high energy fuel compositions for use in reaction type power plants.

Another object of this invention is to provide improved methods of developing thrust.

Another object of this invention is to provide improved methods of operating reaction type power plants, particularly jet propulsion type engines, including rocket, ram-jet, turbo-jet, pulse-jet engines, and turbine type engines, including turbo-prop and gas turbine engines.

Other aspects, objects and advantages of this invention will be apparent from a consideration of the accompanying disclosure and the appended claims.

According to the present invention, there are provided high energy fuel compositions comprising, as an essential ingredient, a cyclododecane hydrocarbon.

Also, according to the present invention, there are provided improved methods of developing thrust, said methods comprising oxidizing a high energy fuel composition comprising, as an essential ingredient, a cyclododecane hydrocarbon with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, a cyclododecane hydrocarbon into the combustion chamber of said reaction type power plant in such proportion as to produce a combustible mixture, subjecting said combustible mixture to combustion, and exhausting the resulting gases from said combustion chamber so as to impart thrust thereto.

Preferably, the cyclododecane component of the high energy fuel compositions of this invention is the cyclic hydrocarbon having the formula

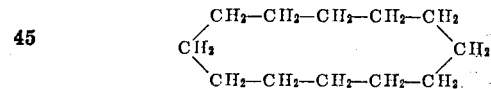

Although the unsubstituted cyclododecane is preferred, the cyclododecanes substituted with one or more alkyl groups are also very useful as components in high energy fuel compositions and, therefore, it will be understood that the term "cyclododecane" also includes cyclododecane substituted with alkyl groups. The substituted cyclododecane hydrocarbons will ordinarily have from one to six alkyl groups having from 1 to 4 carbon atoms in each group. Examples of suitable alkyl groups include methyl, ethyl, propyl, isopropyl, butyl, sec-butyl, and tert-butyl.

The cyclododecanes of this invention may be prepared from butadiene in a two-step process wherein the butadiene is trimerized using a Ziegler-type organometallic complex catalyst to form 1,5,9-cyclodecatriene which is then hydrogenated at low pressure over a noble metal catalyst to form the cylclododecane. The trimerization step is usually carried out at substantially atmospheric pressure and at slightly elevated temperatures. The Ziegler-type catalyst is preferably a titanium tetrachloride-diethyl aluminum chloride mixture; however, other Ziegler-type organometallic complex catalysts can also be used. The hydrogenation step is usually carried out at substantially room temperature and at relatively low pressure; that is, less than 100 p.s.i. Platinum is a preferred hydrogenation catalyst.

The advantages, desirability and usefulness of the present invention are illustrated by the following examples.

EXAMPLE 1

In this example, cyclododecane was prepared in two steps by trimerization of butadiene followed by hydrogenation of the 1,5,9-cyclododecatriene. In the trimerization step, 400 ml. of anhydrous benzene which had been dried by refluxing over calcium hydride and 10 ml. of titanium tetrachloride were placed in a 2-l. round-bottomed flask. The flask was quickly stoppered and transferred to a dry box in which a nitrogen atmosphere was maintained. Thereafter, a bottle of diethyl aluminum chloride was opened within this dry box and 25 ml. of the chloride added to the flask. The flask was then restoppered and removed from the dry box. Immediately thereafter, a gas entry tube was fitted to the flask with provision for maintaining a nitrogen atmosphere over the mixture in the flask and for introducing 1,3-butadiene reactant. Introduction of the butadiene at a rate of 0.9 liter per minute was begun under continued nitrogen flow while applying gentle heat to the flask. After about five minutes, the temperature of the reaction mixture rose to 39° C. and the application of external heat was discontinued. The addition of the butadiene was continued over a period of 90 minutes under continued nitrogen flush until approximately 3.6 moles of butadiene had been introduced. Since the reaction was slightly exothermic, the temperature range was maintained at between 45° C. and 50° C. After the introduction of the butadiene was completed, the reaction mixture was stirred at room temperature for 30 minutes and the catalyst was then decomposed by the dropwise addition of 100 ml. of absolute ethanol with stirring while providing external cooling with an ice bath. The ethanol addition was then followed by the addition of 50 ml. of water. Upon formation of two phases, the organic layer was separated and washed once with aqueous saturated sodium chloride solution. The solvent was then removed by distillation at atmospheric pressure, followed by distillation under reduced pressure, to obtain 110 g. of a colorless distillate boiling at 46–74° C./0.3–0.4 mm. This crude product was then fractionated under reduced pressure through a 1.5 x 37 centimeter column to obtain 89.0 g. of the 1,5,9-cyclododecatriene boiling at 99–102° C./11–12 mm.

In the hydrogenation step 86.4 g. (0.53 mole) of the 1,5,9-cyclododecatriene was reduced at room temperature in a low pressure shaker-type apparatus using 0.1 g. of platinum oxide as a catalyst. When the reduction was complete, 1.51 moles of hydrogen had been absorbed. The waxy solid resulting from the reduction step was dissolved in petroleum ether (B.P. 30–60° C.) and the catalyst removed by filtration. The solvent was removed by distillation to obtain 85 g. of crude cyclododecane. The crude material was further distilled under reduced pressure to obtain 8.0 g. of cyclododecane having a boiling point of 155–158° C./75 mm. and a melting point of 60° C. The product analyzed 85.9% carbon and 14.4% hydrogen as compared with calculated values of 85.6% carbon and 14.4% hydrogen. The proposed structure for the compound was confirmed by inspection of the infrared spectrum of the product.

EXAMPLE 2

In this example, cyclododecane was subjected to inspection tests in order to show from the thermal and physical properties that this compound is suitable for use in the operation of reaction type power plants. The results of these tests are given in Table I.

*Table 1*

THERMAL AND PHYSICAL PROPERTIES OF CYCLODODECANE FUEL

| | |
|---|---|
| Hydrogen/carbon ratio | 0.168 |
| Luminometer number | 106.1 |
| Density at 99° C., g./ml | 0.808 |
| Boiling point | 155–158° C./75 mm. |
| Heat of combustion, B.t.u./lb., net | 18,667 |
| Heat of combustion, B.t.u./gal., net | 136,632 |
| Viscosity at 99° C., cs | 1.59 |
| Thermal decomposition temp., ° F | 740 |
| Melting point, ° F | 110 |

Heats of combustion were obtained with a Parr oxygen bomb calorimeter on both a weight and a volume basis following the ASTM D–240–57T procedure. Density was determined at a temperature of 99° C. using a Lipkin bicapillary pycnometer. Viscosity at 99° C. was measured using the standard Cannon-Fenske capillary viscosimeter following the ASTM D–445 procedure.

The luminometer number was obtained using a luminometer manufactured by the Erdco Engineering Corporation. The procedure for determining luminometer numbers involved burning the fuel in a luminosity lamp and measuring the temperature rise above the lamp for various luminosity readings. From a graph of luminosity readings versus lamp temperature rise, the temperature rise for a luminosity reading of 45 was obtained. The same procedure was repeated to obtain temperature rise values at a luminosity reading of 45 for isooctane and tetralin which serve as reference points of 100 and 0, respectively. The luminometer number was then obtained by dividing the difference between the temperature rise of the test fuel and the temperature rise of the tetralin by the difference in the temperature rise of isooctane and the temperature rise of tetralin multiplied by 100.

The thermal decomposition temperature was obtained using a high temperature, high pressure isoteniscope which consists of a Monel bomb capped at one end and connected to a precision pressure gauge by a Monel diaphragm. The test fuel was heated within the bomb to an elevated temperature under high pressure and the temperature measured at which the fuel began to decompose and evolve gas as determined by the changes of pressure within the bomb. In this method, the formation of the deposits in the decomposition reaction is not measured because some fuels may start to decompose to gas before forming deposits.

The above examples indicate that cyclododecane is very suitable for use in various reaction type power plants. This particular compound has very high heat of combustion on both a weight basis and a volume basis and therefore can be advantageously employed in jet propulsion type engines and turbine type engines where fuels of extremely high energy contents are desired on either a weight basis or a volume basis. This fuel also has a very high luminometer number, which further makes it very useful for use in reaction type power plants.

The cyclododecane of this invention is also characterized by unusually high thermal stability when employed as a fuel for a reaction type power plant. This factor is of importance not only in the actual combustion taking place in the engine but also in the fuel system prior to the burning step. For example, it is necessary in high speed aircraft to use the fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the new hydrocarbon fuel of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet, and gas turbine engines, the oxidizing agent is air which is compressed either by a mechanical compressor or aerodynamically. Also, in automotive and in ship applications the oxidizing agent will ordinarily be air. In contrast to these applications, the oxidizing agent will usually be liquid oxygen or another chemical oxidizer, for example, fuming nitric acid, hydrogen peroxide, fluorine, or the like in guided missile and rocket applications. In some applications, a mixture of oxidizing agents will also be useful.

The fuel compositions of the present invention may be blended with other materials such as gasoline, kerosene, mixtures of gasoline and kerosene, other aviation fuels, and with the presently available jet fuels to produce an improved fuel composition. More particularly, the fuels described herein may be added to the present aliphatic hydrocarbon fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) high energy fuel compositions containing a cyclododecane hydrocarbon as an essential ingredient, (2) improved methods of developing thrust, and (3) methods of operating reaction type power plants.

We claim:

1. The method of operating a reaction type power plant which comprises injecting into the combustion chamber of said power plant a stream of an oxidizing agent and a stream of a hydrocarbon fuel comprising a hydrocarbon selected from the class consisting of cyclododecane and alkyl-substituted cyclododecane wherein alkyl has from 1 to 4 carbon atoms, oxidizing said fuel in said chamber, and exhausting the resulting gases from said combustion chamber so as to impart thrust.

2. The method of operating a jet-gas turbine engine which comprises injecting into the combustion chamber of said engine a stream of an oxidizing agent and a stream of a hydrocarbon fuel comprising a cyclic hydrocarbon selected from the class consisting of cyclododecane and alkyl-substituted cyclododecane wherein alkyl has from 1 to 4 carbon atoms, oxidizing said fuel in said chamber, and exhausting the resulting gases from said chamber through a turbine to develop motive power.

3. The method of operating a turbo-jet engine which comprises injecting into the combustion chamber of said engine a stream of air and a stream of a hydrocarbon fuel comprising a cyclic hydrocarbon selected from the class consisting of cyclododecane and alkyl-substituted cyclododecane wherein alkyl has from 1 to 4 carbon atoms, burning said fuel in said chamber, exhausting the resulting gases from said combustion chamber through a turbine to expand the same and compress the air supplied to said chamber, and passing the resulting gases into the atmosphere by way of a nozzle to impart thrust to said engine.

4. The method of operating a turbo-jet engine which comprises injecting into the combustion chamber of said engine a stream of air and a stream of a cyclic hydrocarbon selected from the class consisting of cyclododecane and alkyl-substituted cyclododecane wherein alkyl has from 1 to 4 carbon atoms, burning said hydrocarbon in said chamber, exhausting the resulting gases from said combustion chamber through a turbine to expand the same and compress the air supplied to said chamber, and passing the resulting gases into the atmosphere by way of a nozzle to impart thrust to said engine.

5. The method of operating a turbo-jet engine which comprises injecting into the combustion chamber of said engine a stream of air and a stream of cyclododecane, burning the cyclododecane in said chamber, exhausting the resulting gases from said combustion chamber through a turbine to expand the same and compress the air supplied to said chamber, and passing the resulting gases into the atmosphere by way of a nozzle to impart thrust to said engine.

References Cited in the file of this patent

UNITED STATES PATENTS

| | | |
|---|---|---|
| 2,765,617 | Gluesenkamp et al. | Oct. 9, 1956 |
| 2,826,037 | Scott et al. | Mar. 11, 1958 |
| 2,903,492 | Schlichting et al. | Sept. 8, 1959 |
| 2,953,606 | Dean et al. | Sept. 20, 1960 |